Patented Oct. 10, 1950

2,525,249

UNITED STATES PATENT OFFICE 2,525,249

MAKING ALKOXY ISOBUTYRIC ACIDS AND DERIVATIVES THEREOF

Charles Weizmann, Rehovoth, Israel, assignor to Polymerisable Products Limited, London, England, a British company No Drawing. Application January 12, 1949, Serial No. 70,589

16 Claims. (Cl. 260—535)

The present application is a continuation-in-part of Ser. No. 591,856, filed May 3, 1945, now abandoned and a continuation-in-part of Ser. No. 640,129, filed Jan. 9, 1946, now Patent No. 2,490,109. This application may be considered as a consolidation of said two pending applications. This application contains certain matter from an earlier application 470,360 filed Dec. 28, 1942, now abandoned.

The present invention has reference to the making of certain alkoxy-isobutyric acids and their derivatives (e. g. esters).

I am aware that previously it was proposed to treat chloretone (a molecular compound or condensation product of chloroform and acetone) with a concentrated aqueous solution of caustic potash and to thereafter add methyl alcohol to the product so produced, and to then boil the mixture. Such a process was stated to yield methyl methacrylate, which could be separated from the other products present by fractional distillation. In said process, the chloretone and the aqueous caustic potash solution were indicated to be at room temperature, when mixed together. Such a process is inoperative to produce the result stated, since the said first reaction is so strongly exothermic that the reaction is violent and a too far-going decomposition of the product is produced.

In accordance with the present invention, the reaction is greatly slowed down by greatly limiting the amount of water present (if any), using a great bulk of an aliphatic alcohol in the reaction mixture, and previously strongly refrigerating the alcoholic solutions before mixing the same and regulating the temperature throughout the mixing operation. Thus the first reaction can be conducted without approaching the high temperatures at which such side reactions (decompositions) can take place.

The present invention has for its object, the safe production of alkoxy-isobutyric acids and their derivatives in yields approaching theoretical, and includes the process of making such bodies. Such substances are of importance for the production of methacrylic acid and its derivatives, in good yield.

The preparation of methacrylic acid derivatives by splitting off water or hydrohalogenic acid from α-hydroxy-isobutyric acid derivatives, or from α-halogeno-isobutyric acid derivatives, respectively, is a very violent reaction which therefore has usually been accompanied by partial polymerization of the product. The alkoxy-isobutyric acids and analogous compounds and their derivatives (which have been made available by a novel and unexpected and unparallelled method) treated as described in the present specification, split off alcohol much more smoothly and give good yields of methacrylic acid derivatives and analogous acids, in a high state of purity, as set out below. The fundamental discovery is the fact that chloretone (readily produced by condensation of acetone and chloroform), or its homologues or derivatives, reacts with alcoholic sodium hydroxide or sodium alcoholate solutions or other corresponding alkali metal compounds, under proper heat control, to give alkali metal salts of alkoxy-isobutyric acids according to the following equation:

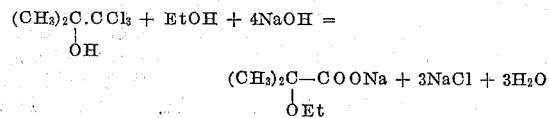

"Et" means ethyl.

These acids give the usual derivatives, such as esters or phenylhydrazides. The esterification, for instance, can be carried out with alcohols in the presence of sulphuric acid. Under certain conditions, especially in the case of higher alcohols, this process is accompanied by a substantial conversion into methacrylic acid esters.

The alkoxy-isobutyric acid esters can be converted into the corresponding methacrylates by various methods, catalytic and non-catalytic ones, for instance by heating with oxalic acid or by passing the same over activated alumina. Another very convenient method consists in heating in the presence of phosphorus pentoxide which when carried out in the presence of the usual polymerization inhibitors, e. g. hydroquinone, pyrogallol or tannic acid, gives almost quantitative yields.

It is obviously not essential for the method that the alkyl groups in the alcohol and in the acid radical of the alkoxy-isobutyric acid esters are one and the same.

EXAMPLE 1

α-Methoxy-isobutyric acid

A cold solution of 448 grams (8 mols.) of potassium hydroxide in 250 c. c. (about 14 mols.) of water and 1000 c. c. (i. e. 796 grams or about 25 mols.) of methyl alcohol are placed in a vessel provided with a stirrer, a condenser and a superposed tank for the starting material. This is cooled to 0° C., or lower. Then one adds while stirring, a refrigerated solution (e. g. at 0° C.)

containing 355 grams (2 mols.) of chloretone in 700 c. c. (i. e. 557 grams or 17 mols.) of methyl alcohol. The use of the low temperature such as 0° C., given above, in bringing the reacting materials together is of great importance, because if the said materials are at or above room temperature, when being mixed, a violent reaction would take place, which would cause decomposition of the desired products, and might even lead to an explosion.

In this example, as will be observed, two mols. (335 grams) of chloretone are treated with 8 mols. (448 grams) of KOH in a liquid vehicle composed of 1353 grams of methyl alcohol and 250 grams of water, i. e. the alcohol is over five times the amount of the water and over 3.5 times the amount of chloretone. Such a liquid, i. e. alcohol carrying a very minor fraction of its weight of water, constitutes the preferred reaction vehicle herein. The large amount of the alcohol serves to control the reaction heat liberated. The KOH is used in the presence of several times its weight of alcohol and water.

The reaction mixture thus contains alcohol in amount much greater than the sum of all the other components of the reaction mixture, and both of the solutions to be brought together are refrigerated, both before and during the first reaction. This prevents the development of any high temperature which would cause undesired side reactions.

One keeps the contents of the vessel for one hour at room temperature and then heats for 2 hours to the boiling point. Then the potassium chloride is filtered off, the excess of methyl alcohol removed by distillation at ordinary atmospheric pressure and most of the water is distilled off under reduced pressure (e. g. while going down to 50 mm. Hg absolute). The residue is treated with a small excess of dilute sulphuric acid to liberate the acid from its potassium salt, and to neutralize any remaining KOH, filtered from the precipitated potassium sulphate and the methoxy-isobutyric acid is extracted with a convenient solvent, for instance ether. The boiling point of the extracted product is 98–99° C., under 20 mm. absolute pressure; yield 160 grams=71% of theory of α-methoxy-isobutyric acid.

Analysis of the product: Calculated, C 50.8, H 8.5, OCH₃ 26.3, mol. wt. 118; found: C 49.9, H 8.7, OCH₃ 25.3, mol. wt. 116.

The phenylhydrazide, needles of M. P. 103°, is obtained when the acid and phenylhydrazine are heated for two hours at 120° C.

In this example, methyl alcohol is used. It will be understood that other aliphatic alcohols, e. g. ethyl, butyl, etc. can be likewise used, in the same amount.

In this example, a strong caustic potash solution in water was used (in admixture with several volumes of methyl alcohol). In other instances, alcoholic sodium hydroxide solution or sodium alcoholate solutions can be used (without water) as the alkali. Sodium alcoholate solutions are usually made by adding metallic sodium to alcohol, using more sodium than enough to react with all water present.

It will be noted that in the above example, the methyl alcohol is 796+557=1353 grams while the sum of all other materials in the reaction mixture is 1053 grams. Thus the amount of the alcohol is (by weight) more than the sum of all the other components in the reaction mixture, or in other words over one half (by weight) of the entire reaction mixture is alcohol, an inert diluent. While the reaction is exothermic, the presence of so much cold alcohol, in the mixture prevents undue rise of temperature.

EXAMPLE 2

α-Ethoxy-isobutyric acid

While stirring, a solution of 35.5 grams of chloretone in 50 cc. of ethyl alcohol is refrigerated to 0° C. This is then added to a refrigerated solution of sodium ethylate in alcohol, also at 0° C., made by adding 16.4 grams of sodium to 300 c. c. of ethyl alcohol, and refrigerating. The mixture is well stirred while being refrigerated, from the beginning of such addition and for an hour period thereafter. Then discontinue the refrigeration (the stirring being continued). The reaction mass comes to room temperature and is stirred for two hours at room temperature. The mixture is then boiled for two hours, filtered, the alcohol distilled off, and after cooling, is acidified with sulphuric acid.

An oily product separates. This oily product boils, under 20 m. m. of mercury at 98°–99° C. Yield 18.5 grams or 70% of theory.

EXAMPLE 3

α-Butoxy-isobutyric acid

The same process as in Example 1, carried out as above, but with butyl instead of methyl alcohol (same weight) yields the acid 70% of theory, boiling point 120–122° C., under 20 mm. absolute presure, characterized by forming a phenylhydrazide, boiling under 24 mm. pressure at 210° C., and forms needles of M. P. 108–109° C.

Analysis of the product: Calculated, O 60.0, H 10.1, mol. wt. 160; found: C 59.8, H 9.8, mol. wt. 155.

EXAMPLE 4

α-(2-ethyl-hexoxy)-isobutyric acid
(new substance)

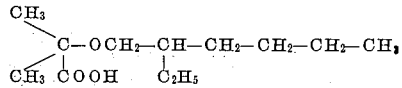

A solution of 71 g. (0.4 mol) acetone-chloroform in 200 cc. 2-ethyl-hexanol at 2° C. was slowly added to the vigorously stirred suspension of 90 g. (1.6 mol) pure potassium hydroxide powder in 400 cc. of 2-ethyl-hexanol at 4° C. The temperature was maintained at 0° to 5° during such addition. The reaction was completed by heating on a steam bath for 2 hours. After filtration of the KCl formed, the clear filtrate was evaporated in vacuo to dryness; the residuel salt mixture was treated with a slight excess of dilute sulphuric acid. Worked up in the usual way, 61 g. α-(2-ethyl-hexoxy)-isobutyric acid, i. e. 70.5% of the theoretical amount was obtained. The acid is a colorless liquid of B. P. 141°/12 mm. absolute pressure.

Analysis: From 4.120 mg.: 10.130 mg. CO₂ and 4.130 mg. H₂O; found, 67.0% C, 11.2% H; calc. for C₁₂H₂₄O₃, 66.6% C, 11.2% H.

This product is claimed in application 640,129, filed Jan. 9, 1946.

The acid is soluble in alcohols and in aromatic hydrocarbons and only moderately soluble in petroleum hydrocarbons and insoluble in water. At low temperatures it crystallizes in the form of needles.

As a by-product of the reaction, a small amount of 2-ethyl-hexyl-α-(2-ethyl-hexoxy)- isobutyrate of B. P. 180–185°/12 mm. was obtained.

Found: 72.5% C, 11.9% H; calc. for $C_{20}H_{40}O_3$, 73.0% C, 12.2% H.

EXAMPLE 5

*α-Allyloxy-isobutyric acid (new substance)*

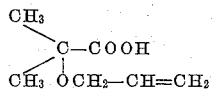

An ice-cold solution of 88.8 g. (0.5 mols) acetone-chloroform in 100 cc. allyl alcohol was slowly added during 2 hours to an ice-cold solution of 112 g. (2 mols) pure potassium hydroxide in 330 cc. allyl alcohol, cooled with ice water and vigorously stirred. After 12 hours at room temperature, the reaction mixture was warmed to 50° C. for 1 to 2 hours. Then after standing over night the precipitate of KCl was filtered and washed with a little allyl alcohol. (110 g.; theoretical amount 111.7 g.) of KCl.

The clear filtrate was evaporated in vacuo at about 50° C. to dryness and the residual salt mixture treated with a slight excess of dilute $H_2SO_4$, whereby an oily layer was formed. The aqueous solution was twice extracted with ether. The ether extract, dried over $CaCl_2$, and the ether evaporated, left an oily residue, distilling at 112–116°/22 mm.

Yield in α-allyloxy-isobutyric acid, 50.0 g.= 69.4% of theory, 0.1522 g. in water: required 10.5 cc.n/10 NaOH (phenolphthalein) for neutralization.

Found: mol. wt. 144.9; calculated, mol. wt. 144. In place of allyl alcohol, its homologues can be similarly used, in same molecular proportions.

EXAMPLE 6

*α-(Butoxy-ethoxy)-isobutyric acid (new substance)*

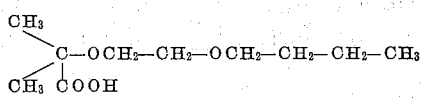

An ice-cold solution of 71 g. acetone-chloroform in 180 grams of butyl-Cellosolve (ethylene glycol monobutyl ether) was added slowly to a well-cooled (0–5° C.) mixture of 105 g. powdered potassium hydroxide and 360 cc. of the same solvent (butyl Cellosolve). (The hydroxide dissolves in the solvent almost completely with considerable evolution of heat and the solution is refrigerated. This is another alcoholic solvent.) The mixture is heated for 3 hours at 100° C. and, after cooling, filtered from the potassium chloride which had precipitated and which was washed with a small amount of butyl-Cellosolve or a more volatile solvent, e. g. ether. Evaporation in vacuo (68–75°/10 mm.) left a brownish solid, which was converted into the desired acid by a slight excess of dilute sulphuric acid over the theoretical amount. The acid was extracted with ether and purified by vacuum distillation. B. P. 138–141°/5 mm Yield, 53 g.=60% of theory. The colorless acid had the density 0.9825.

Analysis showed the following: Found, C 58.6%, H 10.3%; calculated for $C_{10}H_{20}O_4$, C 58.8%, H 9.8%.

EXAMPLE 7

*Butyl ester of α-(2-ethyl-hexoxy)-isobutyric acid (new)*

A solution of 100 g. α-(2-ethyl-hexoxy)-isobutyric acid (made as in Example 4) in 230 cc. n-butanol, containing 2 g. tannic acid as polymerization inhibitor and 2.3 cc conc. $H_2SO_4$, as catalyst, was refluxed for 20 hours, during which period equilibrium was reached. The solution was washed with 20% $Na_2CO_3$ solution and dried with $CaCl_2$. Distillation yielded 110 g. n-butyl α-(2-ethyl-hexoxy)-isobutyrate, i. e. 87.37% of the theoretical amount. The ester boiled at 155°/10 mm. absolute pressure.

Analysis: 4.485 mg.: 11.650 mg. $CO_2$ and 4.680 mg. $H_2O$; found, 70.84% C, 11.67% H; calc. for $C_{16}H_{32}O_3$, 70.65% C, 11.85% H.

EXAMPLE 8

*Dodecyl ester of α-(2-ethyl-hexoxy)-isobutyric acid (new compound)*

40 g. α-(2-ethyl-hexoxy)-isobutyric acid were mixed with 100 g. 1-dodecyl alcohol, 1 g. conc. sulphuric acid, and 1 g. tannic acid and the mixture heated at 120° C. for 24 hours. The reaction flask was connected with a bent condenser so as to remove the water liberated in the esterification. The product was neutralized with calcium carbonate at about 80° and directly fractionated. 51 g. unchanged dodecyl alcohol were recovered in the range between 154 and 200°/10 mm. Then the fraction 200–260°/10 mm. was taken and redistilled. B. P. 232°/10 mm. Yield, 60 g.=86% of the theory. The ester solidified slightly below room temperature and can be recrystallized by precipitation of its acetonic solution with alcohol. The ester is insoluble in alcohol which differentiates it from dodecyl alcohol, but miscible with petroleum ether-acetone mixture.

EXAMPLE 9

*Allyl ester of α-allyloxy-isobutyric acid (new substance)*

The solution of 28.8 g. (0.2 mol) α-allyloxy-isobutyric acid in 50 cc. allyl alcohol, containing 1 g. tannic acid as polymerization inhibitor and 3 cc. conc. $H_2SO_4$, was refluxed for 6 hours. After part of the allyl alcohol had been distilled off, the brownish solution was washed with water, sodium carbonate solution, water, and dried over $CaCl_2$. The fractional distillation, in the presence of some hydroquinone, gave the following result:

B. P. 140–150°; 80–85°/70 mm. allyl methacrylate 5.1 g.=20.2% of theory

B. P. 185–195° allyl α-allyloxy-isobutyrate 25.5 g.=69.3% of theory

The latter substance, which is a colourless oil, can be converted by gentle heating with the equivalent amount of phosphorus pentoxide into allyl methacrylate. This alkoxylation has to be carried out in presence of substantial quantities of polymerisation inhibitors, as the allyl methacrylate forms easily a hard, brittle polymer.

EXAMPLE 10

*Methyl α-methoxy-isobutyrate*

118 grams methoxy-isobutyric acid are heated with 125 cc. of methyl alcohol and 25 cc. of concentrated sulphuric acid for 12 hours. The excess of methyl alcohol is then distilled off and the residue treated with concentrated salt solution. The ester, of which 105 grams (or 80% of theory) are obtained, boils between 134 and 135° C.

Analysis of the product: Calculated, C 54.5, H 9.2, $OCH_3$ 47.0; found: C 54.0, H 9.2, $OCH_3$ 46.7.

For the conversion into methyl methacrylate, 39.6 parts of methyl α-methoxy-isobutyrate are heated for 3 hours with 30 parts phosphorus pentoxide at boiling temperature in the presence of a trace of hydroquinone. The reaction product is obtained pure by simple distillation from the crude mixture. Yield 28.4 parts or 95% of theory.

It is also possible to convert the methoxy ester into methyl methacrylate in the following manner. The vaporized material is passed through activated alumina, at a temperature of approximately 300° C., and with a space velocity of 0.3 volume (liquid) per volume of catalyst, per hour. The reaction product is cooled and collected in a receiver containing a small amount of hydroquinone. Distillation gives the desired product in almost quantitative yield.

EXAMPLE 11

*Ethyl α-ethoxy-isobutyrate*

79.2 grams of ethoxy-isobutyric acid are boiled for 13 hours with 90 cc. of ethyl alcohol containing 15 cc. concentrated sulphuric acid. An addition of 1.5 grams of tannic acid (at the beginning) is advisable. Distillation of the reaction product, at 118 to 120° C., and at atmospheric pressure, first gave 6.9 grams of ethyl methacrylate (10% of theory). The temperature was then raised to 145–160° C., and distillation at these temperatures and at atmospheric pressure gave 84 grams of ethyl α-ethoxy-isobutyrate (87.5% of theory). This latter step (distillation) could also be carried out under vacuum (e. g. under 30 mm. absolute pressure), with practically the same yield. Under 30 mm. absolute pressure, the ethoxy ester boils at 54–56° C.

The ethyl α-ethoxy-isobutyrate can be treated with phosphorus pentoxide, as described above under Example 4, whereby it is converted into ethyl methacrylate, with 90% yield.

EXAMPLE 12

*Butylation of α-butoxy-isobutyric acid*

32 grams of the acid are boiled for 12 hours with a mixture of 50 cc. of butyl alcohol and 10 cc. of concentrated sulphuric acid. The reaction product is isolated by treatment with cold water and is directly separated, after drying, by distillation, into the following fractions:

(Fraction 1): 150–165° C., on redistillation 156 to 162° C. 18 parts or 63.3%, butyl methacrylate.

(Fraction 2): 215–255° C., on redistillation 217–220° C., 15.2 parts or 35.2%, butyl α-butoxy-isobutyrate.

The total yield from this example was thus 63.3+35.2=95.8%.

If this latter substance is heated with phosphorus pentoxide at 80° C., as above stated, it is quantitatively converted into butyl methacrylate.

The term "chloretone" as used herein, is intended to cover a double compound or condensation product of chloroform and acetone, molar ratio 1:1.

It is rather surprising that the reaction between acetone-chloroform (or its homologues or analogous compounds), and caustic alkali, in the presence of alcohol should yield α-alkoxy-isobutyric acid (or its homologues or analogous compounds), since one would expect the reaction to lead to the formation of α-hydroxy-isobutyric acid etc., since hydroxyl groups in aliphatic compounds do not ordinarily become alkylated by alcohols, especially in alkaline solutions.

In accordance with the present invention, however, it appears that the following reactions take place (referring to acetone-chloroform as starting material).

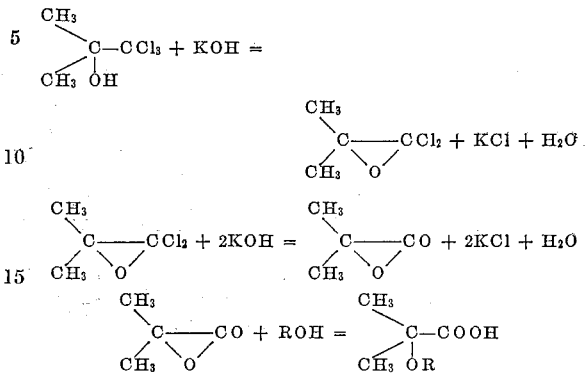

This alkoxy acid of course reacts with KOH to form the corresponding potassium salt, which is the main reaction product (not the ester).

There is often a small amount of the ester formed, thus:—

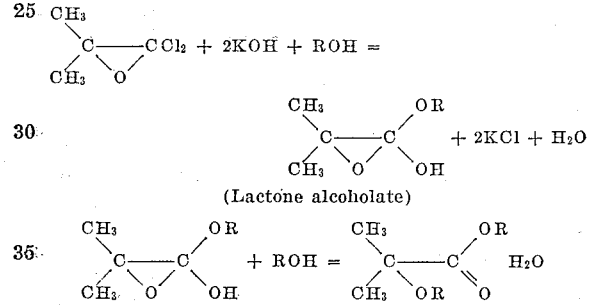

(Lactone alcoholate)

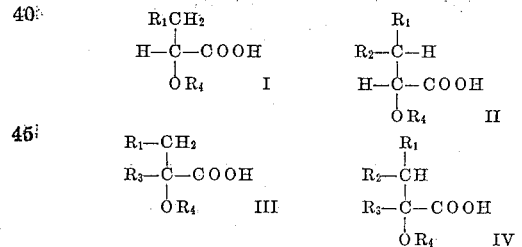

The present invention also involves the production of an acid having a formula selected from

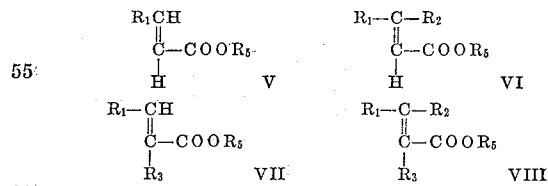

from which an unsaturated ester can be formed corresponding to the following formulas.

$$\begin{array}{cc} R_1CH & R_1-C-R_2 \\ \parallel & \parallel \\ C-COOR_5 & C-COOR_5 \\ | & | \\ H \quad V & H \quad VI \\ \\ R_1-CH & R_1-C-R_2 \\ \parallel & \parallel \\ C-COOR_5 & C-COOR_5 \\ | & | \\ R_3 \quad VII & R_3 \quad VIII \end{array}$$

In these formulae $R_1$, $R_2$, $R_3$, $R_4$ and $R_5$ are hydrocarbon radicles of aliphatic, hydroaromatic, aromatic or aryl-aliphatic nature. In Formula III, the two substituents $R_1$ and $R_3$, with the intermediate —$CH_2$— group and the α carbon atom can also constitute four members of a continuous chain which forms a ring. This formula would then read ($R_1$ and $R_3$ being methylene) as follows:

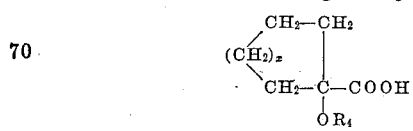

It will of course be understood that $R_5$ in the above formulas is the hydrocarbon radical of the alcohol entering the esterification reaction. In this case Formula VII can be written in the following form:

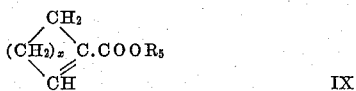

in which $x$ is a whole number.

In U. S. A. application No. 470,360, filed Dec. 28, 1942, of which the present case is a continuation-in-part, a process has been described which converts acetone-chloroform by treatment with a solution of a caustic alkali in an alcohol, under proper conditions, into an α-alkoxy-isobutyric acid, and the esters of such acids can be de-alkoxylated into the esters of methacrylic acid.

According to the present invention it has now been found that the condensation products of chloroform with any aldehyde or any ketone containing at least four carbon atoms, such as are available for example by the process described in a co-pending application 591,856 can be converted by treatment with solution of a potassium hydroxide or sodium hydroxide in any alcohol into alkoxy-substituted acids in the following manner. The

group is hydrolyzed to the alkali derivative of

and the hydroxyl group of the starting material is alkylated by the alcohol used. Thus, the trichloro-tert. amyl alcohol, which is the condensation product between chloroform and methylethyl- ketone, gives with a solution of potassium hydroxide in isobutyl alcohol, α-isobutoxy-methyl-ethyl-acetic acid

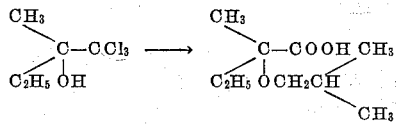

and 1-trichloromethyl-cyclohexanol-1 gives 1-isobutoxy-cyclohexane-1-carboxylic acid

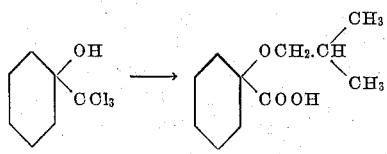

both in the form of their potassium salts.

The process is easily carried out by treating the halogenated alcohol with a solution of the theoretical amount of potassium hydroxide in the desired alcohol, without any addition of water and without subsequent heating, the operation may be carried out in an open vessel, cooled with ice water. The precipitate of potassium chloride formed in nearly theoretical quantity is filtered off, the filtrate is acidified with the necessary amount of sulphuric acid, preferably concentrated, and the precipitate of potassium sulphate is removed by filtration. Thus, a solution of the required alkoxy-acid is obtained; it can be isolated by the customary methods.

These acids give the usual derivatives such as amides, phenylhydrazides and esters. The esters can be de-alkoxylated by treatment with a dehydrating agent, either catalytically or non-catalytically. A very convenient method consists in heating the esters in the presence of phosphorus pentoxide, which when carried out in the presence of the usual polymerization inhibitors, e. g. hydroquinone, pyrogallol or tannic acid, gives almost quantitative yields in the esters of the unsaturated acids derived from the alkoxy-compounds and corresponding to Formulae V, VI, VII, VIII or IX. From butyl α-isobutoxy-methyl-ethyl-acetate, the butyl tiglate, and from isobutyl 1-isobutoxy-cyclohexane-1-carboxylate, isobutyl cyclohexene-1-carboxylate is thus obtained.

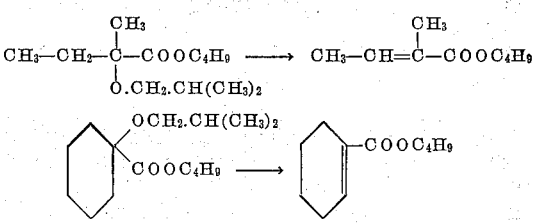

It has been observed that in esterifying the alkoxy-acids in presence of sulphuric acid as catalyst, very often a substantial conversion into the unsaturated esters takes place spontaneously, esterification being accompanied by de-alkoxylation. It is, therefore, not essential to isolate the alkoxy-acids, if only the production of the unsaturated esters is desired. As pointed out, the alkoxy-acids are obtained in the first step in form of a solution of the potassium salts thereof in the alcohol corresponding to the alkyl radicle of the alkoxy-group. Addition to this solution of concentrated sulphuric acid and heating is sufficient to produce the unsaturated esters of the alcohol, in which the first reaction has been carried out.

The following examples, without being limitative, indicate how this part of the invention may be carried out in practice.

EXAMPLE 13

*α-Isobutoxy-methyl-ethyl acetic acid and isobutyl tiglate*

A cold solution of 131 g. of potassium hydroxide corresponding to 112 g. (2 mols.) pure KOH, in 680 cc. (548 grams) isobutyl alcohol was placed in an open flask, fitted with stirrer and dropping funnel. Whilst the solution was vigorously stirred and cooled by ice-salt mixture, a solution of 95.75 g. (0.5 mol.) trichloro-tert. amyl alcohol in 100 cc. 80 grams) isobutyl alcohol was slowly added during 2 hours, the internal temperature being kept at —3° C. During the addition, gas development could be observed. The mixture was stirred for a further two hours at +2° C. and after being allowed to stand at room temperature for several hours finally heated up to 75° C. The potassium chloride formed was filtered off with suction, 106 g. of the dry salt being obtained (theoretical amount 111.8 g.).

The clear filtrate was evaporated in vacuo to dryness. The residual salt mixture was treated with a slight excess of dilute $H_2SO_4$, whereby an oily layer was formed. The aqueous solution was further extracted with ether. Worked up in the normal way, a colorless liquid was obtained having B. P. 122–125° C./20 mm.

Titration: 0.1506 g. in water required 8.5 cc. n/10 NaOH (phenolphthalein).

Found: Mol. weight, 177.1; calculated for $C_9H_{18}O_3$, mol. weight, 174. Yield: 54 g.=62.07% of theory.

*Esterification with isobutyl alcohol*

A solution of 52.2 g. (0.3 mol.) α-isobutoxy-methyl ethyl acetic acid in 80 cc. (64.5 grams)

isobutyl-alcohol, containing 2 g. tannic acid as polymerization inhibitor and 14 cc. $H_2SO_4$ conc. was refluxed for 10 hours. The brown solution was washed with water, dilute $Na_2CO_3$ solution and water, successively, and dried. The fractional distillation with an efficient column, in the presence of some hydroquinone, gave:

At B. P. 107–115° C. isobutyl alcohol, recovered.
At B. P. 175–185° C. isobutyl-tiglate 5.7 g.=12.2% of theory.
At B. P. 219–223° C. isobutyl α-isobutoxy-methylethyl-acetate 54.0 g.=78.2% of theory.

The conversion of isobutyl α-isobutoxy-methylethyl-acetate into isobutyl tiglate of B. P. 175–185° C. was easily effected by heating with phosphorus pentoxide at about 70° C. for one hour, hydroquinone being present, and yielded 94.5% of theory. The de-alkoxylation can lead either to the ester of ethacrylic acid $$CH_2=C(C_2H_5)COOC_4H_9$$

or to the ester of angelic or, more probably, tiglic acid $CH_3.CH=C(CH_3)COOC_4H_9$.

In order to ascertain the structure, a sample of the olefinic ester was saponified with hot methylalcoholic potassium hydroxide solution. The free acid obtained was distilled.

B. P. 197–203° C. The distillate solidified, on cooling in ice for several hours. The M. P. of the crude crystals, pressed on a porous plate, was 55–58° C. These physical constants point to the formation of tiglic acid; this was confirmed by preparation of the dibromide.

EXAMPLE 14

*1-isobutoxy-cyclohexane-1-carboxylic acid and isobutyl cyclohexene-1-carboxylate*

A cold solution of 131 g. potassium hydroxide, corresponding to 112 g. (2 mols.) pure KOH, in 700 cc. isobutyl alcohol was placed in an open flask, fitted with stirrer and dropping funnel. Whilst the solution was vigorously stirred and cooled by ice-salt mixture, a solution of 108.7 g. (0.5 mol.) 1-trichloromethyl-cyclo-hexanol-1 in 100 cc. isobutyl alcohol was slowly added during 2 hours, the internal temperature being kept between −2° C. and 0° C. During the addition, gas development could be observed. The mixture was stirred for a further 2 hours at +2° C. and after being allowed to stand at room temperature for several hours, finally heated up to 75° C. The potassium chloride formed was filtered off with suction, 104 g. dry salt being obtained (theor. amount 111.8 gr.).

The clear filtrate was evaporated in vacuo to dryness. The residual salt mixture was treated with a slight excess of dilute $H_2SO_4$, whereby an oily layer was formed. The aqueous solution was further extracted with ether: By distillation, a colorless viscous oil was obtained, having B. P. 163–168° C./30 mm.

Titration: 0.2192 g. in water required 10.4 cc. n/10 NaOH.
Found: mol. weight 210.7; calculated for $C_{11}H_{20}O_3$ mol. weight 200.1.
Yield: 61.0 g.=61.0% of theory.

*Esterification with isobutyl alcohol*

A solution of 50.0 g. (0.25 mol.) 1-isobutoxy-cyclohexane-1-carboxylic acid in 100 cc. isobutyl alcohol, containing 2 g. tannic acid as polymerization inhibitor and 15 cc. $H_2SO_4$ conc. was refluxed for 2 hours. The brown solution was washed with water, dilute $Na_2CO_3$-solution and water, successively, and dried. The fractional distillation with an efficient column, in the presence of some hydroquinone, gave:

At B. P. 107–115° C. isobutyl alcohol recovered.
At B. P. 135–140° C./28 mm. isobutyl cyclohexene-1-carboxylate 32.0 g.=70.33% of theory,
At. B. P. 150–156° C./28 mm. isobutyl 1-isobutoxy-cyclohexane-1-carboxylate 18.5 g.=28.9% of theory.

The unsaturated ester, isobutyl cyclohexene-1-carboxylate showed on re-distillation B. P. 135–137° C./27 mm. It was a colorless liquid, quickly decolorizing bromine in $CCl_4$-solution. It could be kept unpolymerized in the presence of some hydroquinone crystals.

Isobutyl 1-isobutoxy-cyclohexane - 1 - carboxylate, having on re-distillation B. P. 150–152° C./27 mm., was a colorless oil which did not decolorize bromine.

The esterification gave quantitative yields, forming directly already 70% of the unsaturated ester. The dealkoxylation of the isobutoxy-compound can easily be effected by means of phosphorus pentoxide.

EXAMPLE 15

*α-Isobutoxy-β-ethyl-heptoic acid and isobutyl-β-ethyl-α, β-heptenoate*

A cold solution of 118 g. potassium hydroxide, containing 100.8 g. (1.8 mol.) pure KOH, in 600 cc. isobutyl alcohol was placed in an open flask, fitted with stirrer and dropping funnel. Whilst the solution was vigorously agitated and cooled in ice-salt mixture, a solution of 111.4 g. (0.45 mol.) 1.1.1-trichloro-3-ethylheptanol-(2) in 100 cc. isobutyl alcohol was slowly added during 2 hours, and internal temperature being kept between 0° and +2° C. The reaction was completed by further agitation for 2 hours during which room temperature was attained and finally for 1 hour at 75° C. The precipitate formed was filtered with suction and consisted of 98.0 g. potassium chloride (theor. amount 100.6 g.).

The clear filtrate was evaporated in vacuo to dryness. The residual salt mixture was treated with a slight excess of dilute $H_2SO_4$, whereby an oily layer was formed. It was isolated and the aqueous solution further extracted with ether. α-Isobutoxy-β-ethyl-heptoic acid, $$CH_3(CH_2)_3CH(C_2H_5)CH(OC_4H_9)COOH$$

was obtained as a slightly yellow thick oil having the B. P. 168–175° C./20 mm.

Analysis: 3.772 mg.: 9.404 mg. $CO_2$ and 3.960 mg. $H_2O$.
Found: 67.99% C, 11.74% H.
Calc. for $C_{13}H_{26}O_3$: 67.77% C, 11.38% H.
Yield: 59.5 g.=57.43% of the theoretical amount.

*Esterification of α-isobutoxy-β-ethyl-heptoic acid with isobutyl alcohol*

A solution of 46.0 g. (0.2 mol.) α-isobutoxy-β-ethyl-heptoic acid in 100 cc. isobutyl alcohol, containing 2 g. tannic acid as polymerization inhibitor and 15 cc. conc. $H_2SO_4$ as esterifying agent was refluxed for 6 hours. The brown solution was washed with water, dilute $Na_2CO_3$-solution and water, and dried. Fractional distillation (in the presence of some hydroquinone) gave:

At B. P. 107–115° C. isobutyl alcohol.
At B. P. 125–140° C./23 mm. isobutyl β-ethyl heptenoate 8.5 g.=20.0% of the theoretical amount.

At B. P. 150–165° C./23 mm. isobutyl α-isobutoxy-β-ethyl-heptoate 42.0 g.=73.4% of the theoretical amount.

The unsaturated ester, $$CH_3(CH_2)_3C(C_2H_5)=CH.COOC_4H_9$$

showed on redistillation B. P. 130–135° C./20 mm. It was a colorless liquid, quickly decolorizing bromine in $CCl_4$-solution.

The isobutyl α-isobutoxy-β-ethyl heptoate, $CH_3(CH_2)CH(C_2H_5)CH(OC_4H_9)COOC_4H_9$, B. P. 156–159° C./23 mm., was a colorless oil which did not decolorize bromine.

The esterification proceeded with very good yield (93.4% in total of saturated and unsaturated esters) forming directly 20.0% of the unsaturated ester.

EXAMPLE 16

*De-alkoxylation of isobutyl α-isobutoxy-β-ethyl-heptoate*

28.6 g. (0.1 mol.) isobutyl α-isobutoxy-β-ethyl-heptoate and 20 g. $P_2O_5$ were heated for 2 hours at 100° C. in the presence of some hydroquinone. Distillation gave 18.0 (84.8% of theory) isobutyl β-ethyl-heptenoate, B. P. 130–136° C./20 mm.

I claim:

1. A process of producing an alkali salt of an alkoxy-isobutyric acid which comprises bringing together, at not above 5° C., throughout said step, 1 mol of chloretone with about 4 mols of an alkali metal hydroxide, in the presence of more than 20 mols of an alcohol, any water present being not over 8 mols, the alcohol being in amount greater than the sum of all the other components of said reaction mixture, allowing the mixture to stand at room temperature, and thereafter heating sufficiently to substantially complete the reaction.

2. A process of producing an α alkoxy-isobutyric acid which comprises bringing together at not above 5° C., throughout said step, chloretone with a member of the group consisting of alkali metal hydroxides and alkali metal alcoholates, in the presence of a monovalent alcohol in the amount of over one half of the entire reaction mixture, and thereafter allowing the reaction to continue for a time at about room temperature, then heating to sufficiently complete the reaction, and thereafter removing the solid alkali metal chloride formed, and acting upon the reaction product with a mineral acid in amount sufficient to combine with all the alkali present, including that which is in combination with the α alkoxy-isobutyric acid.

3. A process of making an α alkoxy isobutyric acid which comprises mixing chloretone with an alcohol and a member of the group consisting of alkali metal hydroxides and alkali metal alcoholates, while at a temperature not substantially above 5° C., during the whole of the mixing step, the amount of the alcohol being over three times the amount of the chloretone, thereafter heating the mixture to boiling, removing solid alkali metal chloride formed and removing the excess of alcohol, acidifying the reaction product and separating the α alkoxy isobutyric acid from the acidified product.

4. A process which comprises mixing an ice-cold solution of chloretone and an ice-cold solution of potassium hydroxide in an organic alcoholic solvent, while maintaining the temperature during the whole of the said mixing step at a temperature not substantially above 5° C., and thereafter heating the mixture to sufficiently complete the reaction.

5. A process as in claim 4, in which the solvent is ethylene glycol mono butyl ether.

6. A process of making an α alkoxy isobutyric acid which comprises adding a solution of chloretone in an alcohol to a mixture containing an alcohol and a member of the group consisting of alkali metal hydroxides and alkali metal alcoholates, such addition being conducted at a temperature not substantially above 5° C., and the alcohol in said reaction mixture being in amount more than the sum of all the other components of the reaction mixture, then keeping the mixture at about room temperature for a substantial period of time, then refluxing the mixture for a substantial period of time, then removing the solid alkali metal chloride from the mixture, acidifying the mixture, and separating the α alkoxy isobutyric acid from the acidified product.

7. A process of making an α alkoxy isobutyric acid which comprises adding a solution of chloretone in a monovalent alcohol to a solution of an alkali metal hydroxide in an aliphatic alcohol, the ratio of alcohol to chloretone being over 3.5:1 by weight, all of such addition being made while the reaction mixture is at about 0° C., thereafter boiling the mixture for sufficiently completing the reaction, acidifying the reaction mixture and separating the α alkoxy isobutyric acid therefrom.

8. A process which comprises mixing together a solution of chloretone and of a member of the group consisting of alkali metal hydroxides and alkali metal alcoholates, both dissolved in 2-ethyl-hexanol, and maintaining the reaction mixture at not above 5° C. during the whole of such mixing step, and thereafter heating the mixture sufficiently to substantially complete the reaction, and separating solid alkali metal chloride from the reaction product.

9. A process which comprises mixing a solution of chloretone and of a member of the group consisting of alkali metal hydroxides and alkali metal alcoholates, in an excess of an alcohol containing an ethylenic linkage, and during the whole of said mixing step keeping the reaction mixture at a temperature not substantially above 5° C., thereafter allowing the mixture to stand at room temperature for several hours, separating solid alkali metal chloride from the reaction mixture, and thereafter acidifying the reaction mixture with a mineral acid.

10. A process which comprises mixing a solution of chloretone and of a member of the group consisting of alkali metal hydroxides and alkali metal alcoholates, in an ethylene glycol mono-alkyl ether, and maintaining the solution at not substantially above 5° C., during all of such mixing step, and thereafter heating the reaction mixture to about 100° C. until the reaction is sufficiently completed, removing the solid alkali metal chloride from the reaction mixture and treating the rest of the reaction mixture with a dilute mineral acid.

11. A process of producing an acid having a formula selected from the group consisting of:

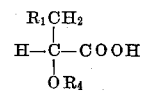
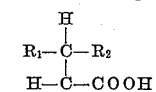
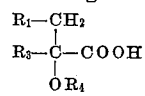

and

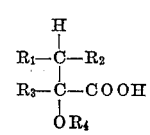

in which each of the substituents $R_1$, $R_2$, $R_3$ and $R_4$ represents a hydrocarbon radical and in which both $R_1$ and $R_3$ may also constitute parts of a closed hydrocarbon ring, which process comprises treating a halogenated alcohol having a formula selected from the group consisting of

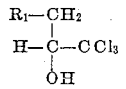 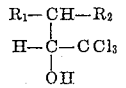 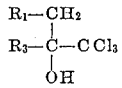

and

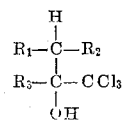

with a solution of a caustic alkali dissolved in several times its own weight of an alcohol of the general formula $R_4OH$, and in the absence of such an amount of water as would be required to dissolve the alkali metal chloride formed by such reaction, such halogenated alcohol and such alcoholic caustic alkali solution being mixed together while maintained cold throughout such mixing step, and the mixture being thereafter heated to sufficiently complete the reaction, separating the undissolved alkali metal chloride from the reaction product and thereafter acidifying the reaction product.

12. A process for the production of an alkoxy acid salt of an alkali metal which comprises treating a compound of the type

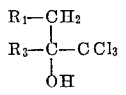

in which each of the substituents $R_1$ and $R_3$ is a hydrocarbon radical, with a solution of a caustic alkali dissolved in an alcohol, said materials being brought together at a temperature not substantially above 0° C., and maintaining the resulting mixture, during all of the step of bringing such materials together, at a temperature not substantially above 0° C.

13. A process for the production of an alkoxy acid salt of an alkali metal which comprises treating a compound of the type

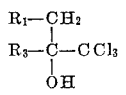

in which each of the substituents $R_1$ and $R_3$ is a hydrocarbon radical, and in which a carbon atom of the radical $R_1$ and the carbon atom of the $CH_2$ group, and the carbon atom in which the $CCl_3$ is bonded and a carbon atom of the radical $R_3$, each constitutes a part of a closed ring, with a solution of a caustic alkali dissolved in an alcohol in the absence of added water, said materials being mixed together at a temperature not substantially above 0° C., during all of said mixing step.

14. A process for the production of an alkoxy acid salt of an alkali metal which comprises treating a compound of the type

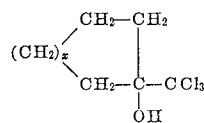

in which $x$ is a whole number, with a solution of a caustic alkali dissolved in an alcohol, in the absence of such an amount of water as would dissolve any major fraction of the amount of alkali metal chloride as would be produced in such reaction, all of said mixing step being carried out while the reaction mixture is kept at a temperature not considerably above 0° C.

15. A process for the production of an alkoxy acid salt of an alkali metal, which comprises treating a compound of the type

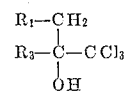

in which the substituent $R_1$ is a hydrocarbon radical and $R_3$ is a hydrogen atom, with a solution of a caustic alkali dissolved in an alcohol, in the absence of any such amount of water as would dissolve more than a minor fraction of the alkali metal chloride formed in such reaction, the said reaction mixture being kept at not substantially above 0° C. during all of the step of mixing such reactants together.

16. A process for the production of an alkoxy acid salt of an alkali metal which comprises treating a compound of the type

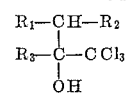

in which the substituents $R_1$, $R_2$ and $R_3$ each is a hydrocarbon radical, with a solution of a caustic alkali dissolved in an alcohol, in the absence of any such amount of water as would dissolve more than a minor fraction of the alkali metal chloride formed in such reaction, the said reaction mixture being kept at not substantially above 0° C. during all of the step of mixing such reactants together.

CHARLES (CHAIM) WEIZMANN.

REFERENCES CITED

The following references are of record in the file of this patent:

UNITED STATES PATENTS

| Number | Name | Date |
|---|---|---|
| 2,226,645 | Thomas et al. | Dec. 21, 1940 |
| 2,490,109 | Weizmann | Dec. 6, 1949 |

OTHER REFERENCES

Banti: Gazz Chim Ital., vol. 59, pp. 819–824 (1929).